No. 669,787. Patented Mar. 12, 1901.
E. W. GROESCHEL.
HOOK AND EYE.
(Application filed Aug. 29, 1900.)
(No Model.)

WITNESSES:
Wm D. Bell
Robert J. Pollitt

INVENTOR
Edwin W. Groeschel,
BY
Gartner & Steward
ATTORNEYS

UNITED STATES PATENT OFFICE.

EDWIN W. GROESCHEL, OF JERSEY CITY, NEW JERSEY.

HOOK AND EYE.

SPECIFICATION forming part of Letters Patent No. 669,787, dated March 12, 1901.

Application filed August 29, 1900. Serial No. 28,387. (No model.)

*To all whom it may concern:*

Be it known that I, EDWIN W. GROESCHEL, a citizen of the United States, residing in Jersey City, in the county of Hudson and State of New Jersey, have invented certain new and useful Improvements in Hooks and Eyes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to hooks and eyes and constitutes an improvement upon the device of this nature described and claimed in my United States Letters Patent No. 628,143, dated July 4, 1899.

The object of the invention is to so construct the parts of the hook member, and particularly that portion thereof which constitutes the tongue, as to facilitate the engagement and disengagement of the members.

The invention consists in the improved hook and eye constructed substantially as will be hereinafter pointed out and finally embodied in the clauses of the claim.

Figure 1:
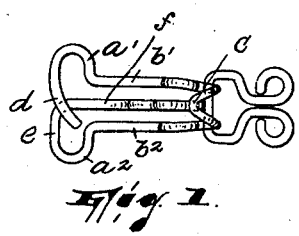
Figure 3:
Figure 2:
Figure 4:
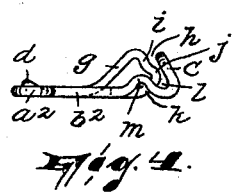
Figure 5:
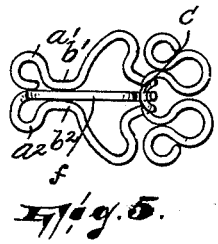

Referring to the accompanying drawings, Figure 1 is a view in elevation of one form of my invention. Fig. 2 is a side view of the hook member of the device shown in Fig. 1. Fig. 3 is a view in side elevation of a slight modification of the hook member shown in Fig. 1. Fig. 4 is a view in side elevation of said hook member, showing a still further modification of the invention; and Fig. 5 shows in elevation one form of device to which some of the distinguishing features of my present invention are especially applicable.

In order to produce the hook member of the device, to which member the improvements involved in my present invention are applied, a piece of wire is bent to form the essential parts of a hook and eye—*i. e.*, the eyelets $a'$ $a^2$, the shank members $b'$ $b^2$, extending forwardly from said eyelets parallel to each other, and the bill $c$.

As described in my copending application Serial No. 28,384 and filed of even date herewith, one extremity $d$ of the wire, the same being at the eyelet end of the hook, crosses the other extremity $e$, also at the eyelet end of the hook, so as to give rigidity to the member. The shank members $b'$ $b^2$ are appreciably spaced, and between them projects forwardly a tongue $f$, forming a part of the extremity $e$. Said tongue extends to a point a little behind the perpendicular line, in which the tip of the bill $c$ is disposed, said bill extending rearwardly at approximately an angle of forty-five degrees relatively to the shank members, or said tongue may extend as far as said perpendicular line. The former construction is illustrated in Fig. 2 and the latter in Fig. 3. According to the arrangement shown in Fig. 3, from the point perpendicularly below the tip of the bill the tongue extends first vertically toward the tip of the bill, and then in a plane slightly beneath the latter it is directed in an upward incline rearwardly, its free end being finally bent rearwardly and downwardly, with its tip touching its body portion. According to the arrangement shown in Fig. 2 the tongue is initially bent at an incline approximately as far as the plane of the bill and between the tip and the base thereof, then extending in a rear upward incline at an angle slightly more acute than is the angle of the bill and then rearwardly and downwardly, its tip preferably touching its body portion. In both of these forms of my invention it will be seen that the end portion $g$ of the tongue being inclined and a sort of pocket $h$ being produced between the bill $c$ and the part $i$ of the tongue, which converge toward each other, the hook and eye may be readily connected by simply drawing the loop of the latter from the eyelet end of the hook toward its bill and so that it will engage the part $g$ of the tongue, depressing the tongue and being guided by the part $g$ (which, it is to be noted, is substantially in the horizontal plane of the tip of the bill) into the pocket $h$. Once in this pocket the continued forward drawing on the eye member will cause its loop to impinge against the back of the inclined bill, wiping against the shoulder $j$, formed between the parts $i$ and $k$ of the tongue, and depressing the latter, so that said loop finally rests in the recess $l$.

If desired, and as shown in Fig. 4, the tongue may be bent first upwardly in an incline toward the tip of the bill to form the part $g$, then in a downward forward incline to form the part $h$, then in a downward rearward incline to form the part $k$, and then rearwardly in the plane of the shank members, its tip preferably touching its body portion.

As seen in Figs. 3 and 4, in order to deepen the pocket $h$ the part $i$ may instead of being straight be curved away from the bill.

Where the part $k$ is inclined, as in Figs. 1, 2, and 4, I provide humps or abutments $m$ in the shank members just back of the starting-point of said part $k$, the same being produced by bending the shank members. These abutments prevent the eye member from working back under the tongue. When the part $k$ is vertical, as in Fig. 3, there is no occasion for these humps, said part $k$ itself constituting an abutment.

By disposing the part $k$ at an incline the disconnecting of the members is greatly facilitated, it being remarked that they are adapted to be separated by twisting them. This feature may be applied with advantage to hooks and eyes constructed like that shown in Fig. 5, which, as described in my copending application Serial No. 28,383, is formed with a view especially to the separation of the members by twisting them apart.

Having thus fully described my invention, what I claim as new, and desire to secure by Letters Patent, is—

1. A hook for a hook and eye consisting of the eyelets, bill, shank and a tongue, the latter extending from the eyelet end of the hook toward the bill end thereof and having an elevation adjacent said bill, said bill and the portion of said elevation immediately adjoining the same converging downwardly toward each other, substantially as described.

2. A hook for a hook and eye consisting of the eyelets, bill, shank and a tongue, the latter extending from the eyelet end of the hook toward the bill end thereof and having an elevation adjacent said bill, said bill and the portion of said elevation immediately adjoining the same converging downwardly toward each other and the latter having a concavity adjacent said bill, substantially as described.

3. A hook for a hook and eye consisting of the eyelets, bill, shank and a tongue, the latter extending from the eyelet end toward the bill end of the hook and having a vertical bend in approximate contact with the back of said bill, the portion of said tongue above the bend, and said bill converging downwardly toward each other and the portion of said tongue beneath said bend being inclined toward the eyelet end of said hook, substantially as described.

4. A hook for a hook and eye consisting of the eyelets, bill, shank and a tongue, the latter extending from the eyelet end toward the bill end of the hook and having a vertical bend in approximate contact with the back of said bill, the portion of said tongue above the bend, and said bill converging downwardly toward each other and the portion of said tongue beneath said bend being inclined toward the eyelet end of the hook, said shank having abutments adjacent said inclined portion, substantially as described.

In testimony that I claim the foregoing I have hereunto set my hand this 28th day of April, 1900.

EDWIN W. GROESCHEL.

Witnesses:
WILLIAM GROESCHEL,
JOHN W. STEWARD.